United States Patent [19]
Ochylski

[11] Patent Number: 5,632,671
[45] Date of Patent: May 27, 1997

[54] CONTINUOUS HOG SKINNING METHOD AND APPARATUS

[76] Inventor: Edward Ochylski, 400 Walnut -Skwalk #1, Des Moines, Iowa 50309

[21] Appl. No.: 677,458

[22] Filed: Jul. 2, 1996

[51] Int. Cl.⁶ .................................................. A22B 5/16
[52] U.S. Cl. ................................................... 452/128
[58] Field of Search .......................... 452/128, 125, 452/129, 130

[56] References Cited

U.S. PATENT DOCUMENTS

| | | |
|---|---|---|
| 243,809 | 7/1881 | Sparrow . |
| 537,215 | 4/1895 | Mead . |
| 2,494,138 | 1/1950 | De Moss . |
| 2,696,633 | 12/1954 | Hincks . |
| 2,871,509 | 2/1959 | Poupet . |
| 3,111,706 | 11/1963 | Kopp . |
| 3,165,781 | 1/1965 | Slotkin . |
| 3,187,377 | 6/1965 | Hager et al. . |
| 3,209,395 | 10/1965 | Jones . |
| 3,229,328 | 1/1966 | Schmidt .................... 452/128 |
| 3,235,905 | 2/1966 | Schmidt . |
| 3,274,639 | 9/1966 | Knauss . |
| 3,324,505 | 6/1967 | Crawford . |
| 3,408,688 | 11/1968 | Sparks . |
| 3,423,789 | 1/1969 | Ochylski . |
| 3,478,386 | 11/1969 | Robison et al. . |
| 3,483,590 | 12/1969 | Balasch et al. . |
| 3,500,494 | 3/1970 | Ochylski et al. . |
| 3,621,514 | 11/1971 | Brown . |
| 3,737,949 | 6/1973 | Davis . |
| 3,789,458 | 2/1974 | Brown . |
| 3,810,277 | 5/1974 | Barber . |
| 3,871,084 | 3/1975 | Carrington . |
| 3,936,908 | 2/1976 | Cook ........................ 452/128 |
| 3,990,127 | 11/1976 | Saltykov et al. ........... 452/128 |
| 4,011,630 | 3/1977 | Ochylski ................... 452/128 |
| 4,021,884 | 5/1977 | Saltykov et al. ........... 452/128 |
| 4,164,056 | 8/1979 | Hilgner et al. ............ 452/128 |
| 4,317,257 | 3/1982 | Engle . |
| 4,322,873 | 4/1982 | Lunn . |
| 4,751,768 | 6/1988 | Trujillo . |
| 4,873,749 | 10/1989 | Couture . |
| 4,934,027 | 6/1990 | Kjorum et al. . |

FOREIGN PATENT DOCUMENTS

| | | |
|---|---|---|
| 1346412 | 11/1963 | France . |
| 142904 | 3/1961 | U.S.S.R. . |
| 1463206 | 3/1989 | U.S.S.R. .................. 452/128 |

*Primary Examiner*—Willis Little
*Attorney, Agent, or Firm*—Donald E. Egan

[57] ABSTRACT

A continuous method for removing the skins or skins from hog carcasses and other animal carcasses is disclosed wherein the skin is pulled upwardly, from the head toward the butt-end of the carcass, as carcass moves through the skinning station while suspended in the head-down position. A jaw hook, synchronized to move with the carcass, engages the carcass to stretch the carcass taut and tilt the carcass away from the skin pulling device. The skin is pulled away from the carcass as the skinning process progresses, which avoids contamination of the carcass as the skin is released. An apparatus suitable for continuously carrying out the method is also disclosed.

25 Claims, 5 Drawing Sheets

CONTINUOUS HOG SKINNING METHOD AND APPARATUS

The present invention relates to a continuous method for removing the skins from hog carcasses and other animal carcasses, wherein the carcass is suspended in the head-down position and the skin is pulled upwardly, from the head of the carcass toward the butt end of the carcass. The invention also relates to an apparatus suitable for continuously carrying out the method of pulling the skin from a suspended hog carcass while the carcass is rapidly moved through a slaughter house. Further, the apparatus of the present invention automatically unshackles the skin after it has been removed from the carcass.

BACKGROUND OF THE INVENTION

Until relatively recently, the conventional method of butchering hogs does not contemplate the removal of the skin or skin prior to the butchering operations, but the hog, after killing, is passed through a series of operations designed to remove the hair and bristles and to thoroughly clean the outer skin surface of the hog carcass. In the conventional procedure, substantially all of the skin or skin remains on the hog during the killing operation and throughout most of the butchering operation.

In order to prepare the carcass for the conventional dehairing operation, the carcass is first scalded by placing it in a tank of hot water (at temperatures of from 135° to 145° F.) for about 5 minutes. The purpose of the scalding tank is simply to loosen up the hair of the hog to prepare the carcass for the dehairer. As is explained below, the hogs move through the slaughtering operation at speeds up to 3200 feet per hour, which requires a very large scalding tank. The installation of such a tank represents a substantial investment and the operation is costly in terms of the floor space required, the overall maintenance and the heat requirement necessary to keep the water at the requisite temperatures. Further, disposal of the water from the tank represents a serious pollution problem.

After the carcasses have been scalded in the tank, they are conveyed to a dehairing machine which comprises a series of rubber paddles which beat most of the loosened hair from the carcass. The dehairing machines are enormous machines which require a great deal of maintenance and consume large amounts of energy.

The next step in the conventional dressing method is to singe the carcass in a gas flame. The purpose of the gas flame is to burn off the remaining hair. In addition to requiring a substantial quantity of fuel, the fumes from the singeing apparatus are pungent and offensive, and represent another pollution problem. The operation of the dehairing and singeing equipment is extremely costly since the equipment required is expensive and requires substantial floor space, as well as requiring continuing maintenance. Further, since Federal regulations require that all equipment in packing houses be cleaned and sterilized on a daily basis, the maintenance of these machines requires a great deal of labor and consequently is very expensive.

Following the singeing operation, the carcasses are shaved to remove the last traces of hair and bristles. In some cases the bristles are sufficiently tough and embedded that portions of the skin or skin must be actually cut away. Since the carcasses vary in size substantially from one to another, it is necessary that the shaving operation be done by hand. In a typical operation, as many as eight men are required to carry out the shaving operation on a system designed to slaughter 1600 hogs per hour.

Following the shaving operation, the carcass is washed and is then ready for the butchering operation whereby the carcass is opened up. The conventional butchering operations which follow the cleaning of the skin include removal of the head, evisceration, splitting the carcass, and inspection of the carcass, which may take place in several stages.

Following the evisceration and splitting operations, in the conventional process, the split carcasses are chilled for a period of 12 to 20 hours in order to lower the internal carcass temperature to approximately 36°–38° F., the temperature necessary to firm up the meat and permit the carcass to be cut into primal cuts, after which various portions are skinned by a variety of methods, all of which involve labor and further expense. Eventually the whole carcass must be skinned which involves a great deal of manual labor. The scalding, singing and shaving operations reduce the value of the skin for use as leather, and the skin is usually relegated for use as gelatin or industrial grease.

In the butchering and dressing of hogs and other such animals, it is common to suspend the animals in the normal head-down position by their hind feet or legs by means of hooks or gambrels. The gambrels are swivelly mounted on trolleys located on carcass tracks which lead through the various butchering operations. The trolleys, and in turn the animals, are moved along the carcass track by a mechanism such as a chain conveyor having pusher plates attached to the chain, which plates push the trolleys about the killing and dressing rooms. In this manner, the animals are moved in a continuous stream to the stations in the plant where the various butchering operations are performed. In a hog butchering plant, the animals are typically hung on two foot centers, which leaves adequate space for the various butchering operations to be performed. To be commercially attractive, such plants must be capable of handling up to 1600 hogs per hour, so that it is desirable that the conveyor move at a maximum speed of up to 3200 feet per hour.

It is obviously desirable to dress as many carcasses as possible within a given period of time, since the unit cost to dress a given carcass will decrease with any increase in the number of carcasses dressed in any given period of time. It therefore follows that if the conveyor is stopped or slowed during any station of the operation, the total number of carcasses dressed in a given period of time will be decreased.

One of the operations in a packing plant which typically causes bottlenecks is the cleaning and dehairing operation.

Machinery has been devised in the prior art, described below, to remove the skin from a hog carcass in substantially one piece while the hog carcass is suspended or moving along a conveyor. In addition to eliminating the conventional scalding and dehairing operation and freeing up a significant amount of floor space in the plant, a skinning operation which does not scald, produces a skin which is a fine leather and is far more valuable than the skin from a scalded animal.

Most of these prior art patents describe the skinning of hogs while the carcasses are suspended in the normal head-down position by the hind legs, because the carcass is in the conventional head-down attitude for the sticking or bleeding operation. The prior art has simply left the carcass in the head-down attitude and devised various types of apparatus designed to skin the carcass while it was in this attitude. Examples of such prior art include U.S. Pat. No. 3,478,386 to Robison describes a non-continous skin puller apparatus which pulls the skin downwardly from the animal while the animal is suspended in the conventional head-down position.

Another example is U.S. Pat. No. 3,209,395 to Jones et al. Which teaches an apparatus for removing skin from animal carcasses wherein the carcass is suspended in the conventional head-down position and two shackles are used to pull the skin downwardly from the butt end to the head. At the present time no small volume slaughter plants are being built. The apparatus described by Jones, however, is not continuous and it is therefore not suitable for use in a high volume operation. Further, the Jones process requires extensive hand skinning of the carcass using ordinary knives or mechanical knives which results in scoring the skin, thus further reducing the value of the skin as leather. Further, the Jones apparatus appears to require the removed skin to be manually lifted from the up-turned hook to separate the skin from the apparatus. Still further, the Jones apparatus would appear to contaminate the carcass when the back of the carcass touches the chain 26 (shown in FIG. 14) as the skin is pulled from the carcass. Such an apparatus could not be used in a plant subject to USDA inspection.

Because it is difficult and heretofore has been considered impractical to skin a hog by drawing the skin from the butt toward the head, many prior art devices such as U.S. Pat. No. 3,423,789 to Ochylski and U.S. Pat. No. 3,621,514 to Brown accomplish the skinning by pulling the skin from the head end of the carcass toward the butt end of the carcass. In order to remove the skin from the carcass while the carcass is in the head-down position, it is necessary to secure the carcass, both by head and foot (butt-end or hind feet suspension), followed by drawing the skin from the head toward the butt in a substantially vertical, upward direction.

However, when hogs, or other animals enter a packing plant, their skins are normally covered with a substantial amount of dirt, loose hair, manure, and the like which has been picked up during transportation and storage in the stockyard pen and even though showered or mechanically scrubbed using equipment like a car wash, most loose hair and debris remain on the skin. If the animal is not dehaired and cleaned prior to the skinning operation, the dirt, hair and other contaminants on the skin have a tendency to fall onto the stripped carcass an embed on the fat of the carcass as the skin is being pulled upwardly. When the skin is finally freed from the carcass, the release is frequently accompanied by a shower of dirt, hair, fecal matter and other debris which falls around and onto the skinned carcass. This dirt becomes embedded in the fat of the carcass where it is very difficult to remove.

The USDA requires that all dirt, hair, fecal matter, or other contamination be removed from the skinned carcass before the carcass is further processed. All such foreign matter must be removed by cutting away the edible meat on which the fecal matter and other contaminants are found. Some prior art suggests that the foreign matter can be removed by washing or spraying, but that approach is not permitted by the USDA because high pressure sprays and showers can actually further imbed foreign particles in the fat or meat of the carcass and cause the fecal matter to further contaminate the meat as it is washed down the carcass. Thus, a hand operation to remove such foreign matter is still required. Removing the foreign matter from the carcass by hand is expensive and time consuming and results in some of the meat being trimmed away from the carcass, where it is relegated to non-edible uses. Thus, both clean up methods are suffer from many problems and are costly.

BRIEF DESCRIPTION OF THE PRESENT INVENTION

The present invention overcomes the problems with the prior art discussed above by providing a system wherein a moving carcass, suspended in the conventional head-down position, is continuously skinned by pulling the skin upwardly from the head toward the butt end of the carcass.

The process of the present invention is accomplished continuously as the carcass passes through a skinning station while suspended from a conventional carcass conveyor. The process of the present invention avoids problems of the prior art by attaching the head of the carcass to a moving jaw puller which tilts the carcass away from the skin puller as the carcass moves through the skinning station. The tilting of the carcass provides two advantages, first the jaw puller places the carcass under tension, i.e. the carcass is rendered taut which assists in the pulling of the skin, and second, the tilting of the carcass away from the skin puller reduces the likelihood of debris falling from the skin onto the carcass as the skin is pulled from and finally released from the carcass.

In the preferred embodiment of the present invention a jaw hook is first engaged in the jaw of the animal. The jaw hook is then coupled to a jaw hook conveyor. The jaw hook conveyor is preferably a horizontal chain conveyor, located adjacent to the floor, which is synchronized to move forward (in the direction that the carcass moves through the skin pulling operation) at approximately the same speed as the carcass. As the carcass moves through the skin pulling station, the track of the jaw hook conveyor moves laterally away from the carcass conveyor which causes the jaw hook to pull the carcass laterally, away from the vertical plane beneath the carcass conveyor. The lateral movement of the jaw hook conveyor causes the carcass to be pulled taut between the jaw hook conveyor and the carcass conveyor.

In the preferred embodiment, the ears and loosened skin from the head of the animal are grasped by a shackle which is permanently coupled to the skin puller. The skin puller is preferably a chain conveyor, running approximately parallel to the carcass conveyor and located on the opposite side of the carcass conveyor from the jaw hook conveyor. The skin puller is also synchronized to move forward at the same speed as the carcass as the carcass moves through the skinning station. At the beginning of the skinning station, the skin puller is positioned somewhat higher than the heads of the carcasses as they come into the skinning station and the skin puller rises upwardly throughout the length of the skinning station. At the end of the skinning station, where the skin finally separates from the carcass, the skin puller is substantially higher than the carcass, and the carcass is tilted away from the direction in which the skin is being pulled. After the skin has been separated from the carcass, the shackle automatically and positively releases the skins from the puller thus eliminating the need for labor to uncouple the skin from the puller. Because the shackle is permanently coupled to the skin puller, there is no danger that the shackle will remain coupled to the skin, where it could damage the equipment used in the subsequent processing of the skin.

The animal skinning system of the present invention reduces the amount of manual skinning required to skin the animal. The reduction of manual skinning is obviously advantageous in that it saves labor costs. However the mechanical pulling system provided by the present invention will minimize the knife damage to the skins and thus produce better skins (a lower incidence of skin scoring and fewer holes in skins), and will result in less edible meat being removed from the carcass.

THE DRAWINGS

The specific nature of my invention will be apparent to those skilled in the art upon reading the detailed specification and claims which follows, reference being had to the drawings in which several embodiments are shown by way of example, and in which:

DETAILED DESCRIPTION OF THE PRESENT INVENTION

The present invention provides a system for continuously skinning hogs or other animals while the carcass is moved through a skinning station on a conventional carcass conveyor. The apparatus of the present invention includes a jaw hook which is inserted into the jaw of a hog carcass as the carcass enters the skinning station; a jaw hook conveyor adapted to releasably couple with the jaw hook inserted in the jaw the hog carcass, and tilt and stretch the carcass as the jaw hook conveyor moves through the skinning station at approximately the same forward speed as the carcass; a skin grasping device adapted to grasp the ears and skin which has been loosened from the head of a hog carcass; and a skin puller which move through the skinning station at the same speed as the carcass and which is adapted to releasably couple with the skin grasping device and pull the skin upwardly as the carcass continuously moves through the skinning station.

Figure 1:
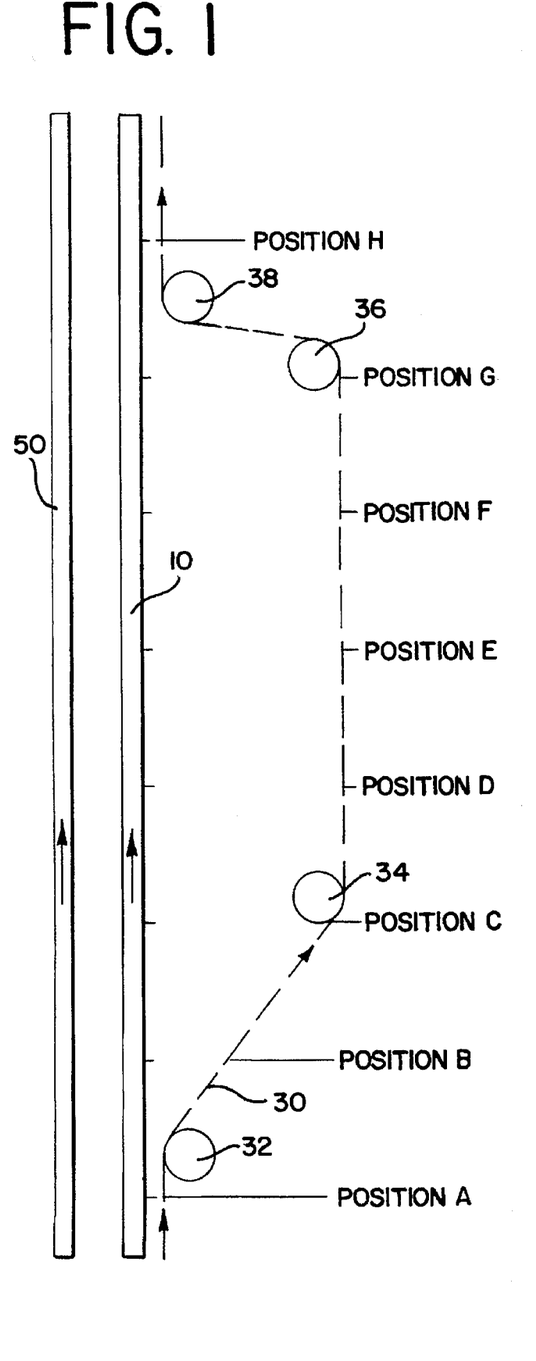
FIG. 1 is a plan view of the carcass skinning apparatus of the present invention.
Figure 2:
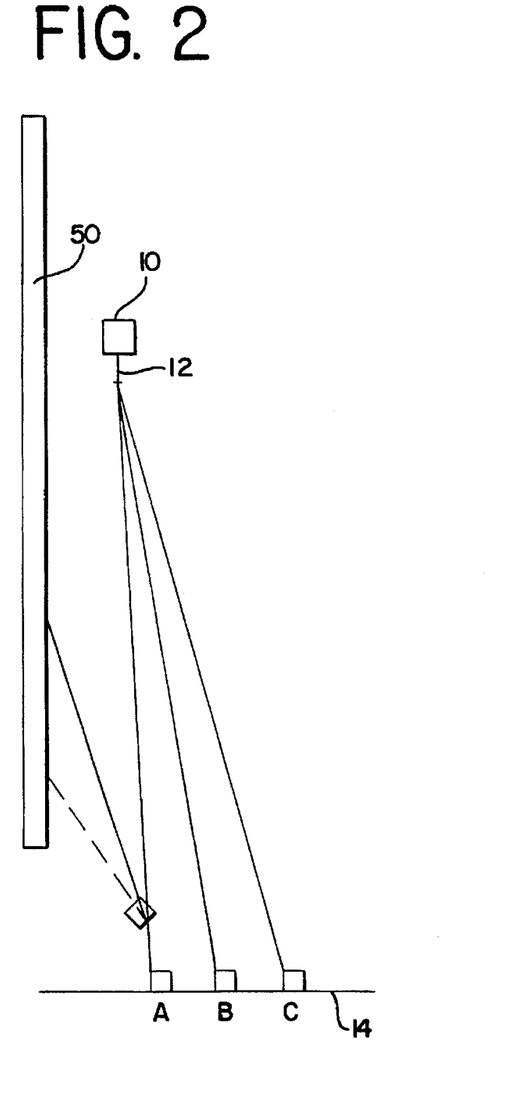
FIG. 2 is an end view of the carcass skinning apparatus showing the orientation of the carcasses as they move from Position A through Position H.
Figure 3:
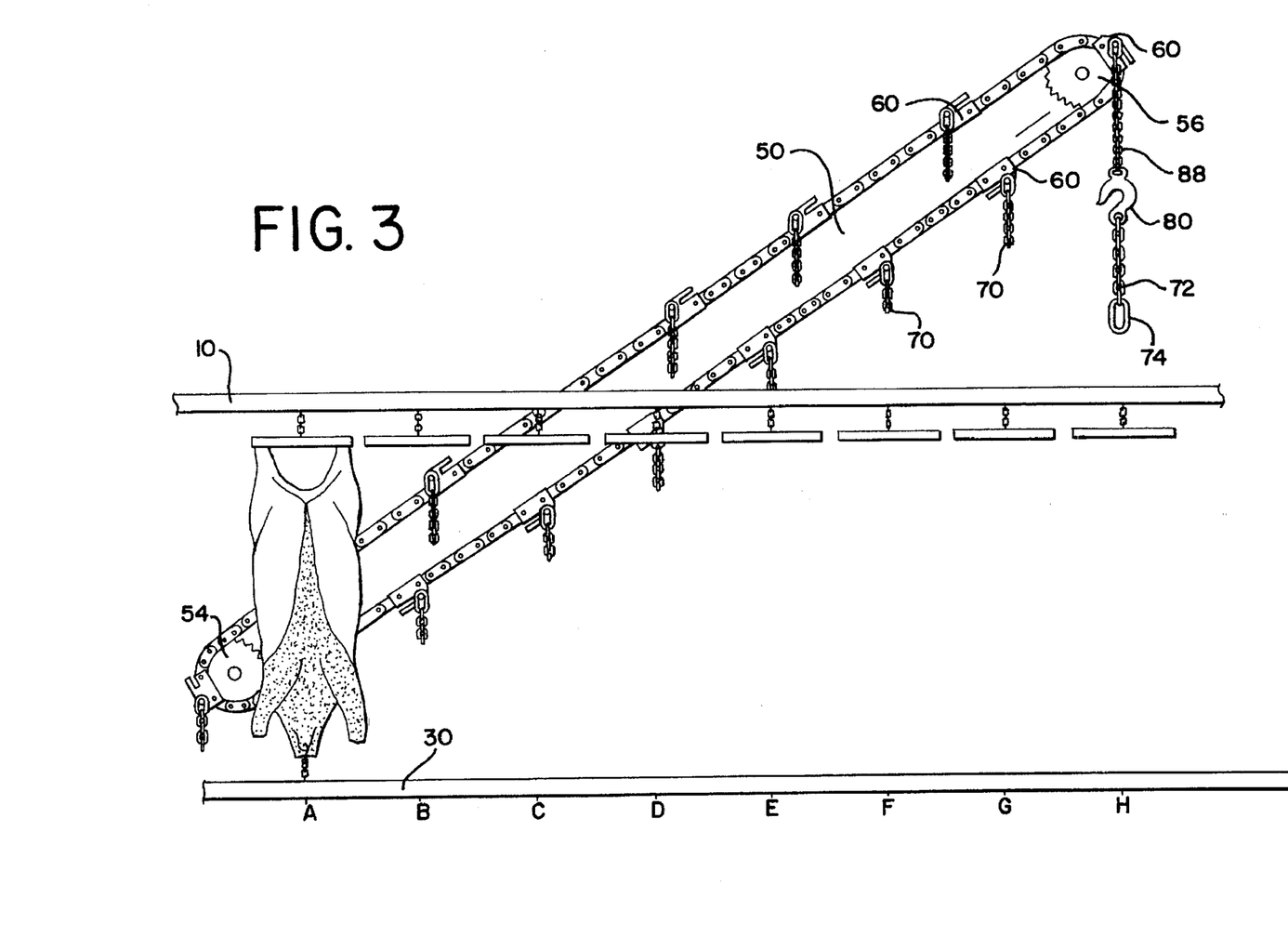
FIG. 3 is a side view of the carcass skinning apparatus showing carcasses at each position as they move from Position A through Position H.

The general floor layout of the skin pulling station is shown in FIG. 1. Carcass conveyor 10 may be a conventional overhead conveyor used to bring the carcasses to the skinning station. Carcass conveyor 10 carries the carcasses through the length of the skin pulling station and carries the skinned carcass to the next slaughterhouse operation.

As is shown in FIGS. 3 through 10, the carcasses are suspended from carcass conveyor 10 by their hamstrings on gambrel hooks 12 of conveyor 10. The precise form of carcass conveyor is not critical and other types of carcass conveyors, such as beef trolleys, may also be used. Conveyor 10 is a conventional conveyor which is typically mounted from the ceiling of the slaughter house (not shown). Generally conveyor 10 is positioned a fixed distance above floor 14.

Jaw hook conveyor 30 is positioned beneath and to one side of carcass conveyor 10. Skin puller 50 is positioned on the opposite side of conveyor 10.

THE JAW HOOK

Jaw hook 42 is shaped to allow it to be inserted in the jaw of a hog carcass. A jaw hook which is suitable for use in the apparatus of the present invention is disclosed in U.S. Pat. No. 3,990,126 to Ochylski. Jaw hook 42 is preferably fabricated from stainless steel to facilitate sterilization. Jaw hook 42 is permanently attached to chain 48 which is used to releasably connect jaw hook 46 to jaw hook conveyor 30 at approximately position A, as show in FIG. 1.

THE JAW HOOK CONVEYOR

Figure 4:
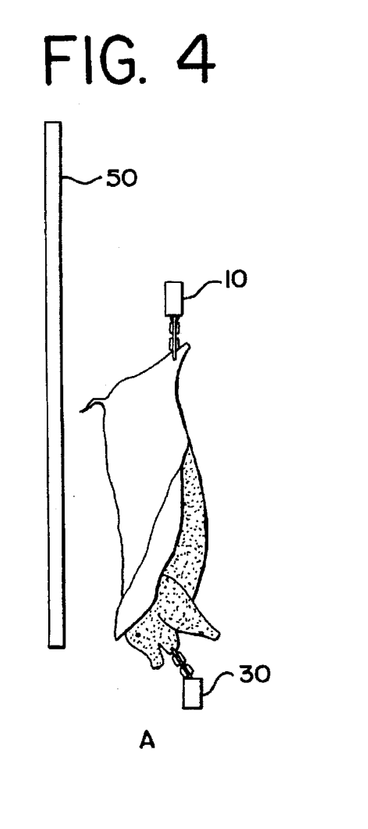
FIG. 4 is an end view of a carcass at Position A.
Figure 5:
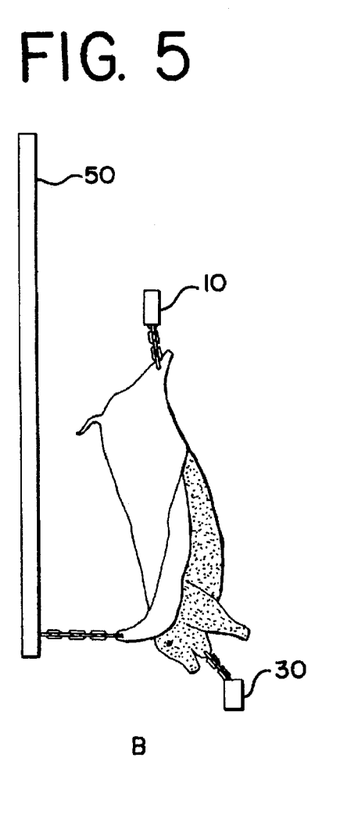
FIG. 5 is an end view of a carcass at Position B.
Figure 6:
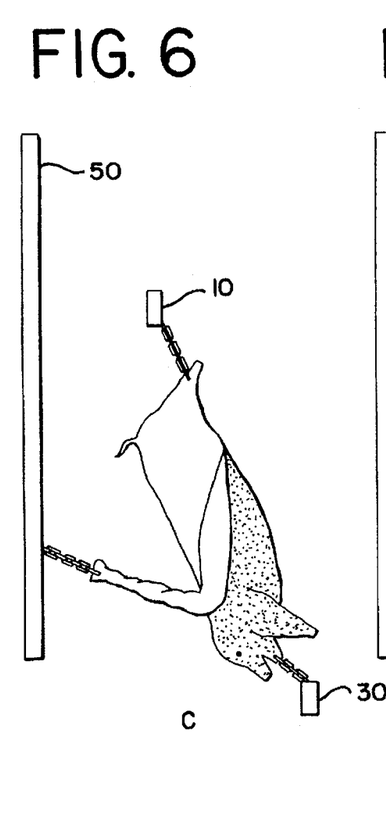
FIG. 6 is an end view of a carcass at Position D.
Figure 7:
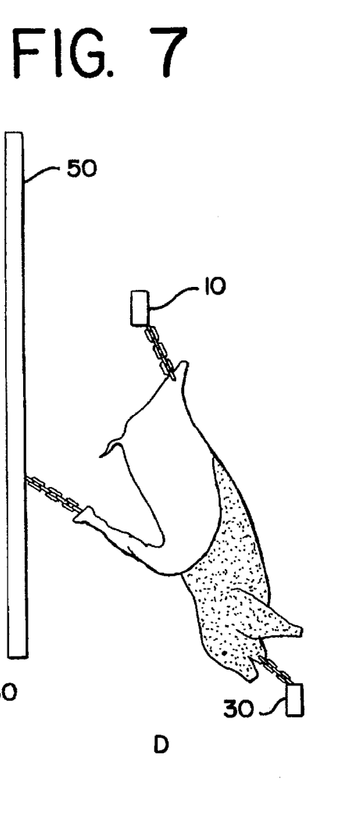
FIG. 7 is an end view of a carcass at Position C.
Figure 8:
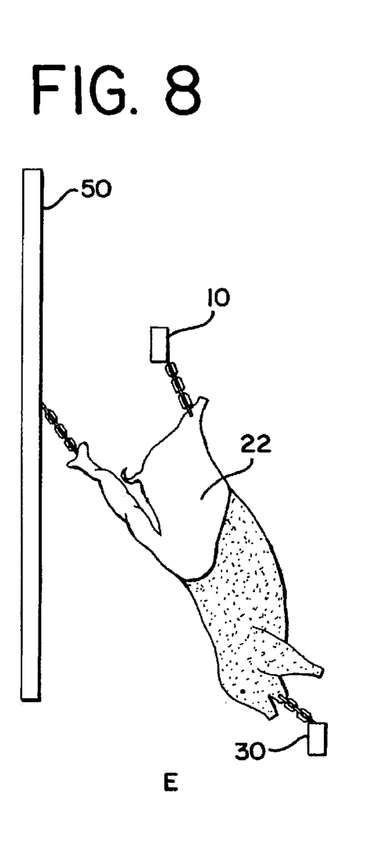
FIG. 8 is an end view of a carcass at Position E.
Figure 9:
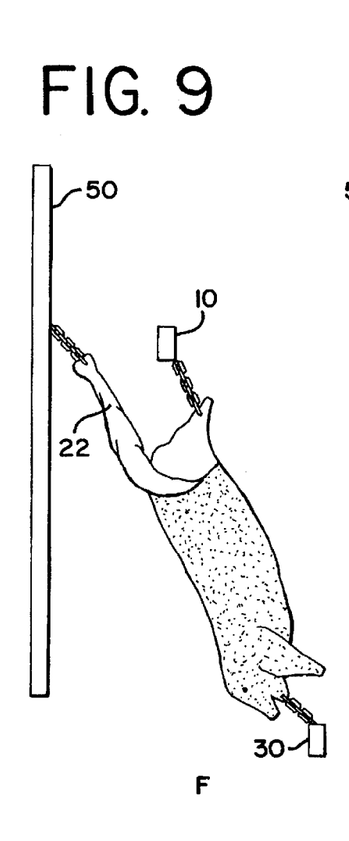
FIG. 9 is an end view of a carcass at Position F.

FIG. 1 shows the plan view of a portion of the track of jaw hook conveyor 30, which is positioned generally beneath carcass conveyor 10 at the beginning of the skinning station, which is identified as Position A (also see FIG. 4). Jaw hook conveyor 30 preferably comprises a continuous, motor-driven chain 31, which moves through the skinning station at approximately the same speed as the carcass. Chain 31 passes over first pulley wheel 32 near the beginning of the skinning station. Thereafter, chain 31 angles laterally away from carcass conveyor 10 through Position B, and Position C and over second pulley wheel 34 which is at approximately Position D. The chain 31 of jaw hook conveyor 30 then moves in a direction parallel with carcass conveyor 10 through Positions E, F and G. Chain 31 of jaw hook puller 30 then passes over third pulley wheel 36 and moves laterally toward the carcass conveyor. When chain 31 arrives approximately beneath the carcass conveyor, it moves over the fourth pulley wheel 38 and then again moves parallel to the carcass conveyor. Continuous chain 31 then loops back to the starting position, ahead of Position A, by a path which is not shown in FIG. 1.

A wide variety of mechanisms may be used to releasably couple chain 48 to jaw hook conveyor 30. In the preferred embodiment, chain 31 of jaw hook conveyor 30 is fitted with fixtures, such as fixture 60, described below, which have either slots adapted to couple with chain 48 or with hooks which are adapted to couple with chain 48. Because the length of the carcasses varies, the elevation at which the jaw hooks engage the carcasses vary. Chain 48 is used to releasably engage jaw hook 46 to jaw hook conveyor 32 at appropriate positions, allowing the operator to releasably connect the jaw hook to the conveyor with a minimum of energy. In other words, the operator need not attempt to pull the carcass taut at the time the chain 48 is engaged with chain 32 of jaw hook conveyor 30.

As chain 31 of jaw hook conveyor 30 moves through the skinning station, the lateral movement stretches the carcass as it moves from Position A to Position C. The lateral movement of the jaw hook conveyor also tilts the carcass away from the vertical plane beneath the carcass conveyor. The present invention contemplates tilting the carcass up to 30 degrees from vertical.

The distance that jaw hook conveyor 30 moves in lateral direction may be varied depending upon the particular layout of the plant. It is preferred that the lateral distance be sufficient to cause the carcass to be stretched into a taut position, which assists in the skin pulling operation and a sufficient distance to tilt the bulk of the skinned carcass away from the plane beneath the carcass conveyor when the skin is pulled from the carcass in order to minimize any contamination of the carcass by hair, dirt, feces or other matter falling from the skin.

Although it is preferred that the jaw hook conveyor 30 be horizontally positioned on the floor 14 of the plant, the jaw hook conveyor may be tilted so that it rises above the floor as the track of the jaw hook conveyor moves laterally away from the plane beneath the carcass conveyor. This will allow the carcass to be tilted to a greater angle without becoming too taut to cause damage to the carcass. Alternatively, when it is desired to tilt the carcass to greater than about 20°, it may be advantageous to use a spring device which would allow the carcass to be stretched taut without doing any anatomical damage to the carcass.

THE SKIN PULLER

In the preferred embodiment, skin puller 50 runs parallel to said carcass conveyor 10, but is laterally spaced away from the vertical plane beneath carcass conveyor 10, on the opposite side of that plane from the jaw hook conveyor. Skin puller 50 is synchronized to run at the same forward speed as the carcasses on the carcass conveyor 10. The lowest point of skin puller 50 is preferably somewhat higher than the head of the carcass, and the highest point of skin puller 50 is higher than carcass conveyor 10.

In the preferred embodiment, skin puller 50 is a motor-driven chain conveyor comprising endless chain 52 which runs between lower pulley 54 and upper pulley 56. Fixtures 60, which are attached to chain 52 by bolts 62, are designed to releasably connect skin grasping devices to skin puller 50.

While it is generally preferred to have the skin puller 50 run on a path which is parallel to the vertical plane beneath carcass conveyor 10, the present invention contemplates positioning the skin puller 50 at an angle so that it gradually moves laterally away from the vertical plane beneath the carcass conveyor. This allows the skin to be spaced the further distance away from the bulk of the carcass as the skin is finally released from the carcass. This embodiment may be used in connection with jaw hook pullers wherein the lateral distance of the jaw hook puller from the vertical plane beneath the carcass conveyor is maximized. While this embodiment provides an advantage, it requires a greater amount of floor space within the plant because of the lateral dispersion of the equipment in this embodiment.

THE SHACKLE

Figure 12:
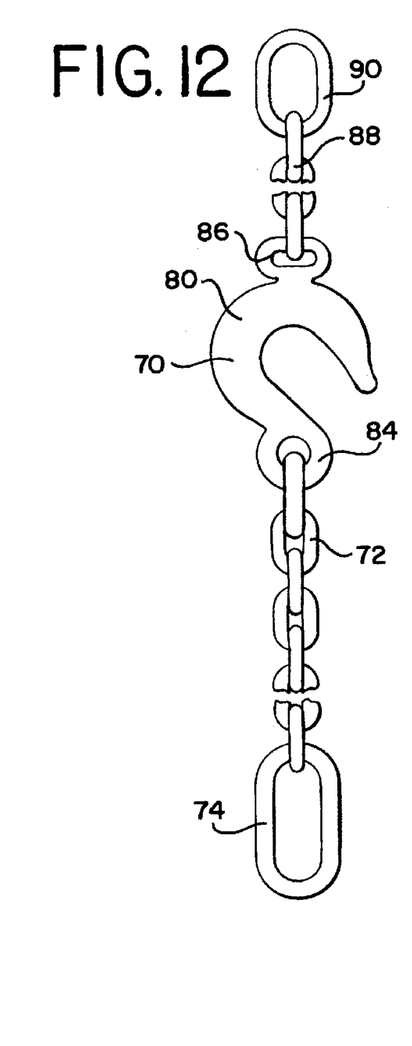
FIG. 12 is a side view of the skin pulling shackle.
Figure 13:
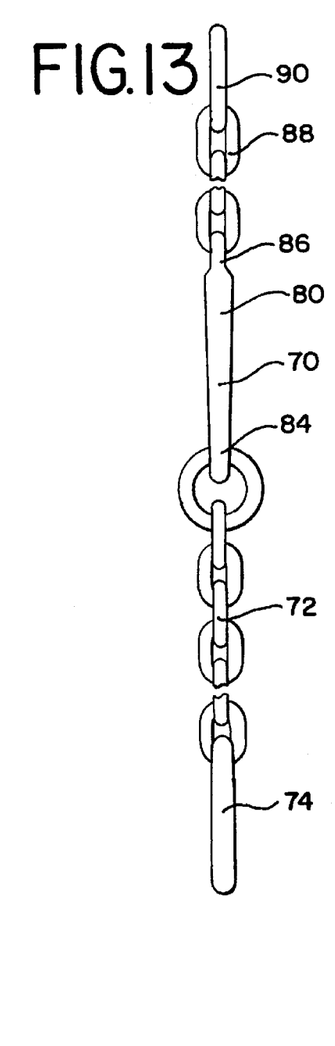
FIG. 13 is an end view of the skin pulling shackle.

In the preferred embodiment, a shackle is used to grasp the skin of the carcass. Although any skin grasping device may be used in connection with the apparatus of the present invention, it is preferred to use a shackle of the type shown in U.S. Pat. No. 3,500,494 to Ochylski and Kopp. A similar shackle is shown in FIGS. 12 and 13. In the preferred embodiment, one shackle 70 is permanently mounted on the skin puller for each gambrel hook 12 and they are synchronized to move through the skinning station at the same forward speed.

The preferred shackle comprises a pull chain 72, a hook 80 and a release chain 88. Hook 80 has an opening large enough to accommodate pull chain 72, whereby pull chain 72 may be looped through the opening of hook 80 to form a noose. The noose is used to grasp loosened skin of the carcass. One end of pull chain 72 is attached to the eye 84 of hook 80, which is adjacent to the opening of hook 84. The opposite end of pull chain 72 is configured to releasably couple the shackle to the skin puller. In one embodiment, one end of pull chain 72 is fitted with a lug or loop 74 adapted to releasably couple pull chain 72 of shackle 70 to puller 50.

In the preferred embodiment, release chain 88 of shackle 70 is permanently attached to continuously moving chain 52 of puller 50. Fixture 60 is permanently attached to chain 52 by bolts 62. Preferably, release chain 88 is permanently connected to fixture 60 by bolt 68 which engages loop 90 on the end of release chain 88. Alternatively release chain 68 may be welded to fixture 60, or release chain 88 of shackle 70 may be attached directly to chain 52.

Figure 14:
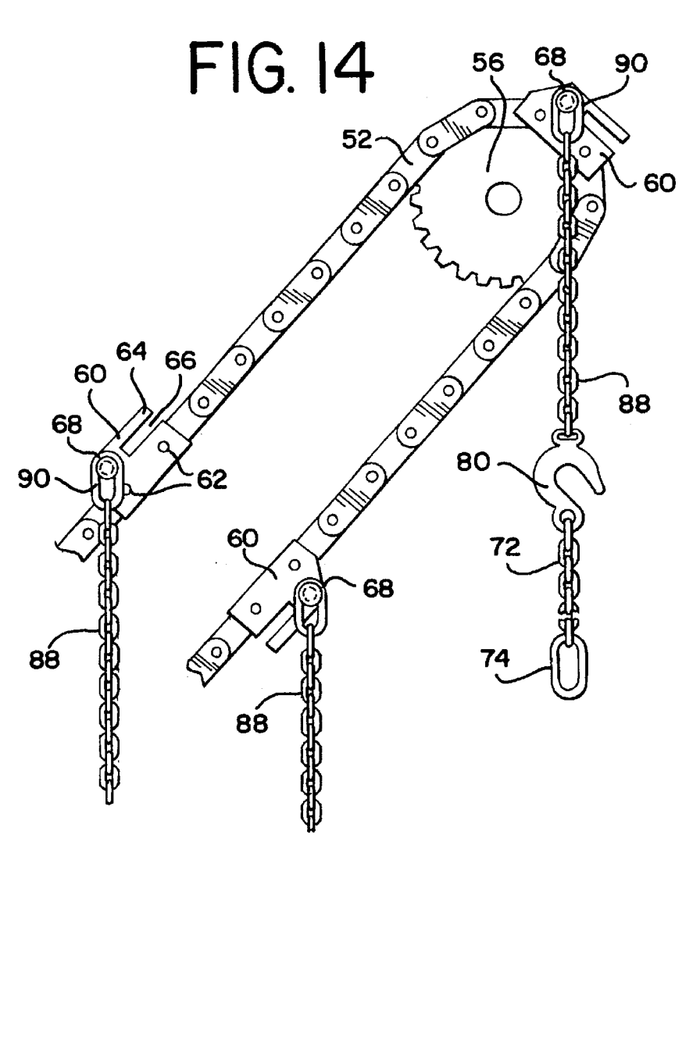
FIG. 14 is a side view of the fixture used to connect the skin pulling shackle to the skin puller.

The preferred embodiment of fixture 68 is shown in FIG. 14, wherein slot 66, integrally formed by extension 64 of fixture 60, is adapted to releasably couple with any of the links of pull chain 72 or to engage loop or ring 74 positioned at the end of chain 72. Alternatively, chain 52 may be fitted with pulling hooks (not shown) adapted to releasably couple with loop 74 or any of the links of pull chain 72.

As is shown in FIG. 14, slot 66 of fixture 60 is oriented with its open side facing upwardly during the upward (pulling) movement of chain 52 by skin puller 50. Thus, slot 66 is adapted to couple with a link of pull chain 72 and move shackle 70 upwardly as chain 52 moves upwardly through the pulling station. After the skin has been separated from the carcass and chain 52 reaches its highest point (See FIG. 11 and Position H of FIG. 3), chain 52 moves over upper pulley 56 and begins to move downwardly, reversing the orientation of slot 66, as shown in FIG. 14. In the reversed orientation, slot 66 opens downwardly which allows the link of pull chain 72 or loop 74 to slide out of slot 66 and shackle 70 is then supported by release chain 88, with the opening of hook 80 facing downwardly. The weight of the skin causes pull chain 72 to slide out of the opening of hook 80 and thus open the noose. The result is that the skin is automatically released from the skinning apparatus and the shackle is recycled to the start of the pulling station.

OPERATION

One of the major advantages of the present invention is the reduction in the amount of required hand skinning. Generally, it is essential that the skin around the head, including the ears of the carcass must be loosened by a hand skinning operation in order to provide a flap of skin that can be readily and reliably grasped by the skin grasping shackle. Preferably, the entire head to the nape of the neck and portions of the forelegs and shoulders are preferably skinned by hand before the mechanical skin pulling process is started. The preferred areas for hand skinning are shown as the shaded areas on the carcass in FIG. 3 and FIG. 4.

The skinning station may include an area or a platform for a butcher/operator to skin the head of the carcass to hand skin the head of the carcass. The specific location for the manual skinning operation is not critical and those skilled in the art will understand that the manual skinning can most conveniently take place near the beginning the skinning station.

The jaw hook 46 is inserted in the jaw of the carcass and jaw hook chain 48 is releasably connected to jaw hook conveyor 30. As the carcass moves from Position A to Position B, the lateral movement of the jaw hook conveyor 30 begins to tilt the carcass away from the vertical plane beneath carcass conveyor 10 and begins to stretch the carcass taut.

When the carcass arrives at the skin pulling station with a portion of skin already loosened from the head, the operator grasps shackle 70, which is suspended from puller 50 by release chain 88, and forms a noose around the loosened skin by inserting pull chain 72 in the opening of the hook 80. The noose is tightened by hand and the free end of pull chain 72 is engaged in slot 66 of fixture 60 using either one of the links of chain 72 or loop 74. Preferably one of the chain links of the pull chain 72 is engaged in slot 68 in order to start the pull at an earliest point.

Figure 10:
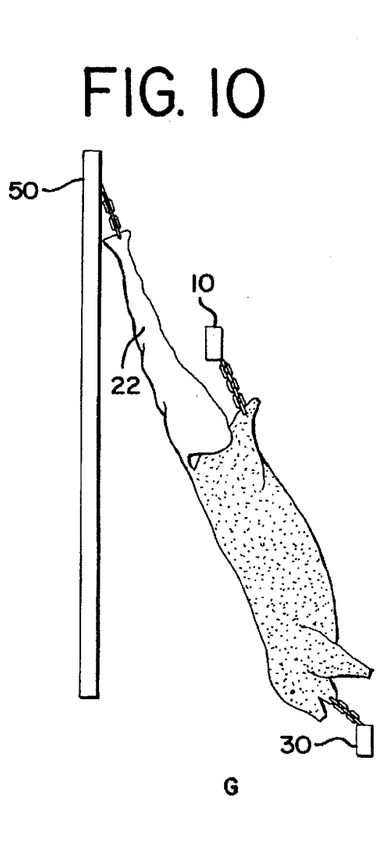
FIG. 10 is an end view of a carcass at Position G.

As the carcass passes from Station B through Stations G and H, skin puller 50 pulls upwardly on the shackle 56 which pulls the skin upwardly off the animal, thus continuously removing the skin from the carcass in a single piece. The lateral movement of jaw hook conveyor 50 tilts the carcass away from the direction in which the skin is being pulled, thus minimizing the possibility of contamination on the carcass during the pulling operation and when the skin is finally freed from the carcass. As is shown in FIG. 10, when the skin is about to be released from the carcass, the carcass is tilted away from the direction in which the skin is being pulled, which minimizes the risk of the carcass being contaminated by debris falling from the skin.

Figure 11:
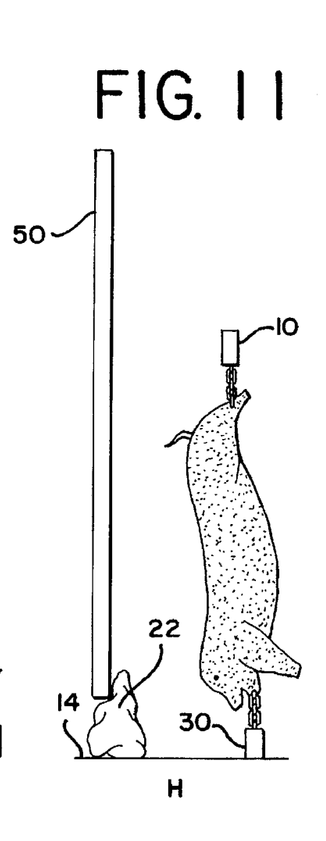
FIG. 11 is an end view of a carcass at Position H.

When the chain and shackle reaches the top of skin puller 50, as is shown in FIG. 14, the shackle automatically opens and drops the skin from the skin puller to the space immediately below, as shown in FIG. 11. If desired the skins may be dropped into a bin or onto an endless belt or conveyor which could automatically move the hides away. Because the shackle is permanently affixed to puller 50, the shackle is returned to position A on continuous chain 52. This process allows for the hide to be automatically released from the pulling equipment, without the need for any labor and without any danger that the shackle will remain with the skins, which is a major advantage, in that a shackle which remains connected to a skin will cause severe equipment damage in subsequent skin processing operations.

After the carcass passes Position G, the skin has been separated from the carcass, the jaw hook conveyor 30 moves the carcass laterally back toward the vertical plane beneath conveyor 10 at Position H. At this position, the carcass is no longer taut and jaw hook chain 48 is readily released from the jaw hook conveyor 30 and jaw hook 46 is removed from the carcass. Jaw hook 46 is than sterilized and recycled to position A.

ALTERNATIVE EMBODIMENTS

Those skilled in the art will understand that other types of skin grasping devices may be used, such as those described in U.S. Pat. No. 4,322,873 to Lunn.

OTHER ANIMAL SPECIES

The foregoing drawings and specification are focused on the apparatus specifically designed for use in skinning hogs. However, it should be understood that the present invention may be used to skin other species of animals such as cattle, calves, sheep, lambs, and horses.

When animals other than hogs are processed by the present invention, it may be necessary to substitute a foreleg securing device for the jaw hook described above. For example, in those species of animals that have more fragile jaws, the forelegs may be secured using devices such as hooks or shackles and these devices may be releasably coupled to the jaw hook conveyor and used to stretch and tilt the carcasses in the manner described above.

Those skilled in the art will understand that different amounts of hand skinning would be required by different species of animals and for animals of different age, size, or sex within any given species.

The scope of the invention herein shown and described is to be considered only as illustrative. It will be apparent to those skilled in the art that numerous modifications may be made therein without departure from the spirit of the invention or the scope of the appended claims.

I claim:

1. A continuous method of skinning an animal carcass comprising the steps of:
   a. suspending a carcass in the head-down position;
   b. moving said head-down carcass continuously through a skinning station;
   c. inserting a jaw hook in the jaw of the carcass;
   d. coupling said jaw hook to a jaw hook conveyor, said jaw hook conveyor being synchronized to move through said skinning station at approximately the same speed as the carcass, said jaw hook conveyor being positioned approximately beneath the carcass at the start of said skinning station and moving laterally away from beneath the carcass as the carcass moves through said skinning station, which lateral movement stretches said carcass taut and tilts said carcass from vertical and into a back-down attitude;
   e. freeing the skin on at least a portion of the head of the carcass;
   f. grasping the freed skin and coupling said freed skin to a skin puller, said skin puller synchronized to move through said skinning station at the same speed as the carcass, said skin puller being positioned away from the direction of the carcass tilt;
   g. pulling said skin upwardly and away from the direction of carcass tilt as the carcass moves through said skinning station; and
   h. separating said skin from said carcass in a direction away from the tilt of the carcass, whereby the contamination of the carcass by debris from the skin is minimized.

2. A continuous method of skinning an animal carcass comprising the steps of:
   a. suspending a carcass from its hind legs in the head-down position;
   b. moving said head-down carcass continuously through a skinning station;
   c. inserting a jaw hook in the jaw of the carcass;
   d. coupling said jaw hook to a horizontal chain conveyor synchronized to move through said skinning station at approximately the same speed as the carcass, said horizontal chain conveyor starting approximately beneath the carcass at the start of said skinning station and moving laterally away from beneath the carcass as it moves through the skinning station which lateral movement stretches said carcass taut and tilts said carcass from vertical and into a back-down attitude;
   e. freeing the skin on at least a portion of the head of the carcass;
   f. grasping the freed skin and coupling the freed skin to a chain link skin pulling conveyor, said chain link skin pulling conveyor synchronized to move through said skinning station at the same speed as the carcass, said skin puller being positioned away from the direction of the carcass tilt;
   g. pulling said skin upwardly and away from the carcass as the carcass moves through said skinning station; and
   h. separating said skin from said carcass in a direction away from the carcass, whereby the contamination of the carcass by debris from the skin is minimized.

3. The method of claim 2, wherein the animal is a hog.

4. The method of claim 2, wherein a shackle is used to grasp the freed skin and to couple the freed skin to said skin pulling conveyor.

5. The method of claim 2, wherein the skin is grasped by a shackle which provides automatic release of the skin after it has been separated from the carcass.

6. The method of claim 2, wherein the ears of the carcass are coupled to said skin pulling conveyor.

7. The method of claim 2, wherein the skin is coupled to said skin pulling conveyor simultaneously with the coupling of said jaw hook to said horizontal chain conveyor.

8. The method of claim 2, wherein the jaw hook is coupled to said horizontal chain conveyor by a chain.

9. An apparatus for continuously skinning animal carcasses comprising:
   a. an carcass conveyor system adapted to continuously move animal carcasses in the head-down position through a skinning station;
   b. a jaw hook, said jaw hook adapted to be inserted in the jaw of a carcass as the carcass moves through the skinning station;
   c. a jaw hook conveyor, said jaw hook conveyor being synchronized to move through the skinning station at approximately the same speed as the carcasses, said jaw hook conveyor having a track located approximately beneath said carcass conveyor near the start of the skinning station, said jaw hook conveyor track leading laterally away from said carcass conveyor as they move through the skinning station and said jaw hook conveyor leading back toward said carcass conveyor near the end of said skinning station;
   d. an attachment to releasably couple said jaw hook to said jaw hook conveyor, whereby, as said carcass moves through said skinning station, said jaw hook conveyor moves away from said carcass conveyor to render said carcass taut and to tilt said carcass away from the vertical plane beneath said carcass conveyor;
   e. a skin puller, said skin puller positioned to the side of said carcass conveyor opposite said jaw hook puller, said skin puller being synchronized to move through the skinning station at the same speed as the carcasses;
   f. a skin grasping device; and
   g. means to releasably couple said skin grasping device to said skin puller, whereby, as said carcass moves through said skin pulling station, said skin puller pulls the skin grasped by said devise upwardly and away from said tilted carcass.

10. The apparatus of claim 9, wherein said jaw hook conveyor is approximately horizontal.

11. The apparatus of claim 9, wherein said jaw hook conveyor comprises a horizontal chain conveyor.

12. The apparatus of claim 9, wherein said track of said jaw hook conveyor leads a lateral distance sufficient to incline the carcass to up to 30 degrees from vertical.

13. The apparatus of claim 9, wherein said skin puller is a chain link conveyor.

14. The apparatus of claim 9, wherein said skin puller is disposed parallel to the vertical plane beneath said carcass conveyor.

15. The apparatus of claim 9, wherein said skin puller is angled away from said carcass conveyor, whereby said skin puller is closer to the vertical plane beneath the carcass conveyor at the beginning of the skinning station than at the end of said skinning station.

16. An apparatus for continuously skinning animal carcasses comprising:
   a. an carcass conveyor system adapted to continuously move animal carcasses in the head-down position through a skinning station;
   b. a jaw hook, said jaw hook adapted to be inserted in the jaw of a carcass as the carcass moves through the skinning station;
   c. a jaw hook chain conveyor, said jaw hook chain conveyor being synchronized to move through the skinning station at approximately the same speed as the carcasses, said jaw hook chain conveyor located approximately beneath said carcass conveyor near the start of the skinning station, but said jaw hook chain conveyor moving laterally away from said carcass conveyor as they move through the skinning station;
   d. means to releasably couple said jaw hook to said jaw hook chain conveyor, whereby, as said carcass moves through said skinning station, said jaw hook chain conveyor moves away from said carcass conveyor to render said carcass taut and to tilt said carcass away from the vertical plane beneath said carcass conveyor;
   e. a skin pulling chain conveyor, said skin pulling chain conveyor positioned to the side of said carcass conveyor opposite said jaw hook chain conveyor, said skin pulling chain conveyor running approximately parallel to said carcass conveyor and being synchronized to move through the skinning station at the same speed as the carcasses;
   f. a skin grasping shackle; and
   g. a fixture to releasably couple said shackle to said skin pulling chain conveyor, whereby, as said carcass moves through said skin pulling station, said skin pulling chain conveyor pulls the skin grasped by said shackle upwardly and away from said tilted carcass.

17. The apparatus of claim 16, wherein said jaw hook conveyor is approximately horizontal.

18. The apparatus of claim 16, wherein said jaw hook conveyor comprises a horizontal chain conveyor.

19. The apparatus of claim 16, wherein said track of said jaw hook conveyor leads a lateral distance sufficient to incline the carcass to up to 30 degrees from vertical.

20. The apparatus of claim 16, wherein said skin puller is a chain link conveyor.

21. The apparatus of claim 16, wherein said skin puller is disposed approximately vertical.

22. The apparatus of claim 16, wherein said skin puller is angled away from said carcass conveyor, whereby said skin puller is closer to the vertical plane beneath the carcass conveyor at the beginning of the skinning station than at the end of said skinning station.

23. The apparatus of claim 16, wherein said shackle comprises a hook, a pull chain and a release chain.

24. The apparatus of claim 23, wherein said release chain is permanently affixed to said puller.

25. The apparatus of claim 23, wherein said fixture uncouples said pull chain after the skin has been pulled from the carcass.

* * * * *